United States Patent
Conceicao et al.

(10) Patent No.: US 8,156,550 B2
(45) Date of Patent: Apr. 10, 2012

(54) ESTABLISHING SECURE DATA TRANSMISSION USING UNSECURED E-MAIL

(75) Inventors: Ladislau Conceicao, Redmond, WA (US); Vanessa Feliberti, Sammamish, WA (US); Paul Tischhauser, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 12/143,749

(22) Filed: Jun. 20, 2008

(65) Prior Publication Data

US 2009/0319780 A1    Dec. 24, 2009

(51) Int. Cl.
    *G06F 7/04*    (2006.01)
(52) U.S. Cl. .......... 726/10; 726/9; 726/27; 726/18; 726/19; 713/156; 713/172
(58) Field of Classification Search .......... 726/9, 10, 726/18, 19, 27; 713/156, 172
    See application file for complete search history.

(56) References Cited

U.S. PATENT DOCUMENTS

| | | | |
|---|---|---|---|
| 5,568,552 A * | 10/1996 | Davis | 705/59 |
| 7,120,929 B2 | 10/2006 | Beattie et al. | |
| 7,143,285 B2 | 11/2006 | Gindin et al. | |
| 7,251,728 B2 | 7/2007 | Toh et al. | |
| 2003/0172272 A1 | 9/2003 | Ehlers et al. | |
| 2004/0128392 A1 | 7/2004 | Blakley et al. | |
| 2005/0144463 A1 | 6/2005 | Rossebo et al. | |
| 2006/0095760 A1 * | 5/2006 | Benantar et al. | 713/156 |
| 2006/0184997 A1 * | 8/2006 | La Rotonda et al. | 726/2 |
| 2006/0235795 A1 * | 10/2006 | Johnson et al. | 705/44 |
| 2007/0005730 A1 | 1/2007 | Torvinen et al. | |
| 2007/0255951 A1 | 11/2007 | Grynberg | |
| 2007/0288551 A1 * | 12/2007 | Sidon | 709/203 |
| 2009/0235073 A1 * | 9/2009 | Braun et al. | 713/169 |
| 2009/0254747 A1 * | 10/2009 | Bussani et al. | 713/168 |

FOREIGN PATENT DOCUMENTS

IE    WO2007072468 A1    6/2007

OTHER PUBLICATIONS

WS-Trust OASIS Standard, Mar. 19, 2007; pp. 1-75.*
Apshankar, "WS-Security Security for Web Services", 2002, Web Services Architect, pp. 5.
"Brokered Authentication: Security Token Service (STS)", retrieved at <<http://msdn2.microsoft.com/en-us/library/aa480563(printer).aspx>>, Microsoft Coporation, 2008, pp. 10.
"Security in a Web Services World: A Proposed Architecture and Roadmap", Apr. 7, 2002, Version 1.0, International Business Machines Corporation, pp. 20.
Wang, et al., "Extending the Security Assertion Markup Language to Support Delegation for Web Services and Grid Services", Proceedings of the IEEE International Conference on Web Services (ICWS'05), Workshop on Secure Web Services , IEEE, 2005, pp. 8.

* cited by examiner

*Primary Examiner* — Christopher Brown
(74) *Attorney, Agent, or Firm* — Capitol City TechLaw; Richard C. Irving

(57) ABSTRACT

In one embodiment, a host entity may create a trusted connection with a guest entity. The host entity may encrypt a trusted connection invitation for an external guest entity using a proof of possession of a trusted token for the external guest entity. The host entity may transmit the encrypted trusted connection invitation to the external guest entity. A guest entity may decrypt the trusted token, and then use the proof of possession to decrypt the trusted connection invitation.

20 Claims, 6 Drawing Sheets

100

*600*

ESTABLISHING SECURE DATA TRANSMISSION USING UNSECURED E-MAIL

BACKGROUND

A first user from a first organization may want to exchange electronic data with a second user from a second organization. The first user may export administrative data such as calendars, appointments, contacts, and other data for business issues. The first user may use a variety of protocols to share the administrative data. The first user may use a variety of methods to share such data securely. The first user may ask the second user for a material proof, such as a password, digital key, or other authentication method, before allowing access to the data on the subscriber side and to enforce authentication and authorization on the sharer side.

E-mail, or electronic mail, may refer to a store-and-forward method of composing, sending, receiving, and storing messages over electronic communication systems. The term "e-mail" (as a noun or verb) may apply to several different types of systems, including the internet e-mail system based on the simple mail transfer protocol (SMTP), X.400 systems, and intranet systems allowing users within an organization to e-mail each other. Intranets may use internet protocols or X.400 protocols for internal e-mail service. Messages may be exchanged between hosts using SMTP with software programs called mail transport agents (MTAs). Users may download their messages from servers with standard protocols, such as Internet Message Access Protocol (IMAP), or with a proprietary protocol.

E-mail may not always be secure. Messages using SMTP, a text based protocol, may traverse the Internet, going through any number of servers, routers, and domains. Along any of these routes, the message may be intercepted and modified. Even if the message is not modified, an undesirable person may be able to view the message's contents, making e-mail unsuitable for confidential business or personal information.

Entities that depend on secure e-mail may operate private e-mail servers that do not transmit e-mail addressed to recipients within the organization over the Internet. Instead, these e-mail servers may transmit e-mail over a secure corporate network, using either a local area network (LAN) or a virtual private network (VPN) in combination with LANs to create a secure channel to connect remote offices of the same organization. However, members of these organizations may want to send e-mail to or share data with a member of another organization.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a host entity creating a trusted connection with a guest entity. The host entity may encrypt a trusted connection invitation for an external guest entity using a proof of possession of a trusted token for the external guest entity. The host entity may transmit the encrypted trusted connection invitation to the external guest entity. A guest entity may decrypt the trusted token and use the proof of possession to decrypt the trusted connection invitation.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

A host entity from a host organization may create a trusted connection with a guest entity, allowing the guest entity from a guest organization to access administrative services and data available on the host entity. The trusted connection may be created using a secured e-mail transmission. The host entity and the guest entity may both belong to a trust federation to facilitate a secure e-mail transmission between entities from each of the two systems. The host entity may encrypt a trusted connection invitation for an external guest entity using a proof of possession from a trusted token for the external guest entity received from the trust federation. The host entity may transmit the encrypted trusted connection invitation to the external guest entity. A guest entity may decrypt the trusted token and use the proof of possession to decrypt the trusted connection invitation. The guest entity may use the information contained in the trusted connection invitation as a digital key to create a trusted connection with the host entity.

Figure 1:
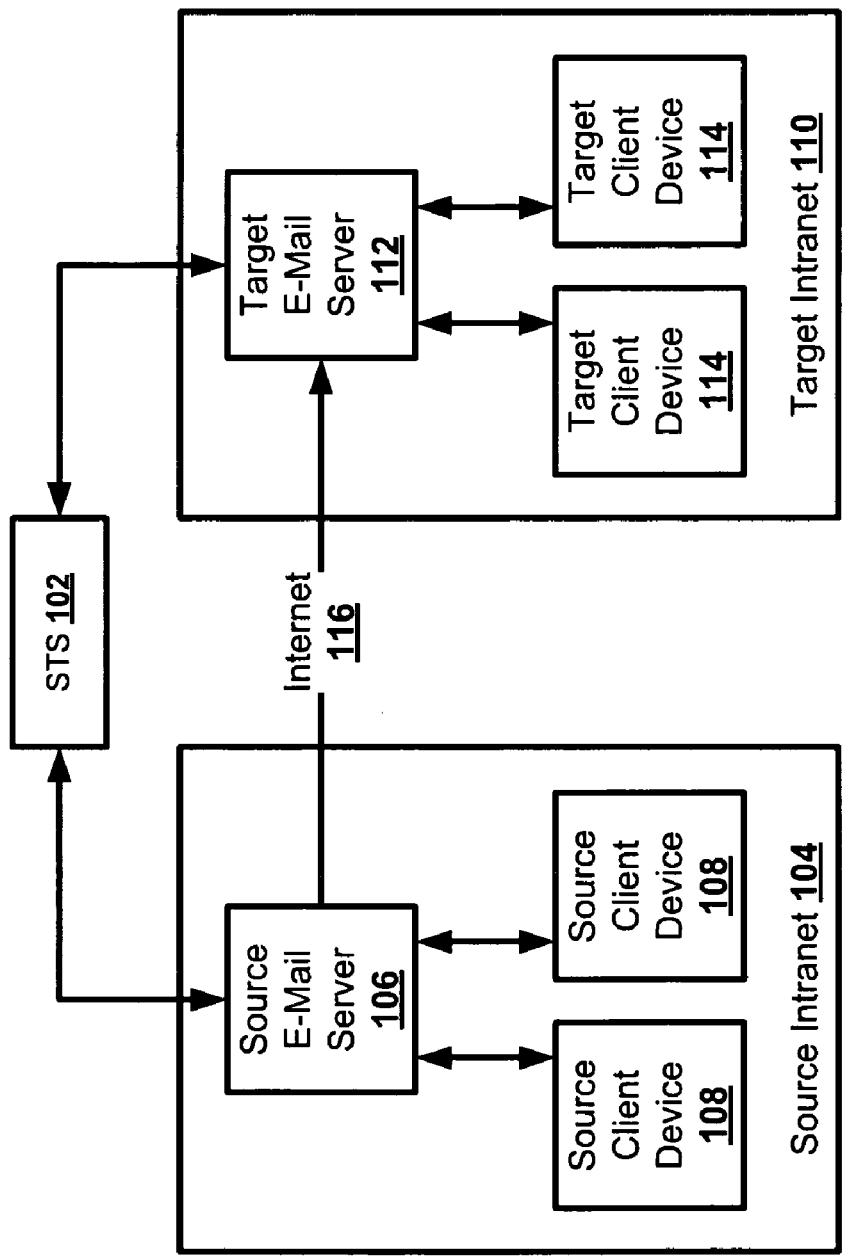
FIG. 1 illustrates, in a block diagram, an e-mailing system using a trust federation.

To create a trusted connection between two organizations, the two organizations may belong to a trust federation. FIG. 1 illustrates in a block diagram an e-mailing system 100 using a trust federation. The trust federation may be administered by a secure token service (STS) 102, representing one or a cluster of servers. Two or more organizations may belong to the trust federation. Each organization may belong to one or more trust federations, as long as one of those trust federations may have as a member both the source organization of the secure e-mail transmission and the target organization. STS 102 may be accessible by each of the organizations via the internet or other unsecured network. Each organization may provide identity information to STS 102, such as a certificate, public keys, shared secrets, and other secure identifiers. An administrator may provide the secure identifiers to the STS 102 by mail, in person, or by another secure method.

The source organization may have its own secure internal network, or source intranet 104, connecting each device used by the organization, such as a local area network (LAN). Source intranet 104 may have a source e-mail server 106 providing e-mail services to all source client devices 108 in source intranet 104. Source e-mail server 106 may refer to a cluster of servers. A source client device 108 may send a secure e-mail to another source client device 108 in source intranet 104 via source e-mail server 106. A source client device 108 may also send an e-mail to a member of a target organization external to the source organization via source e-mail server 106. The target organization may have its own secure internal network, or target intranet 110, connecting each device used by the organization. Target intranet 110 may have a target e-mail server 112 providing e-mail services to all target client devices 114 in target intranet 110. Target e-mail server 112 may refer to a cluster of servers. Source e-mail server 106 may send e-mails to target e-mail server 112 via the internet 116.

To securely send an e-mail, source e-mail server 106 may receive a new e-mail message from a source client device 108. Source e-mail server 106 may identify the domain or host of the message recipient by inspecting the message header, for simple mail transfer protocol (SMTP), or properties, for messaging application programming interface (MAPI). Source e-mail server 106 may send a request to STS 102 that identifies source e-mail server 106 as a part of the source organization using the organization's identity information and requests a token for securely communicating with target e-mail server 112.

STS 102 may verify the identity of source e-mail server 106 by comparing the received identity information with the previously provided identity information. If the information matches, then STS 102 may send the requested token for securely sending e-mail to the target e-mail server 112. Source e-mail server 106 may encrypt the e-mail message using the received token and may send the encrypted e-mail message to target e-mail server 112. Target e-mail server 112 may receive the e-mail message and may decrypt the message using the target organization's identity information. If the message is successfully decrypted, then target e-mail server 112 may deliver the e-mail message to the inbox of the target client device 114 for retrieval by the recipient.

Figure 2:
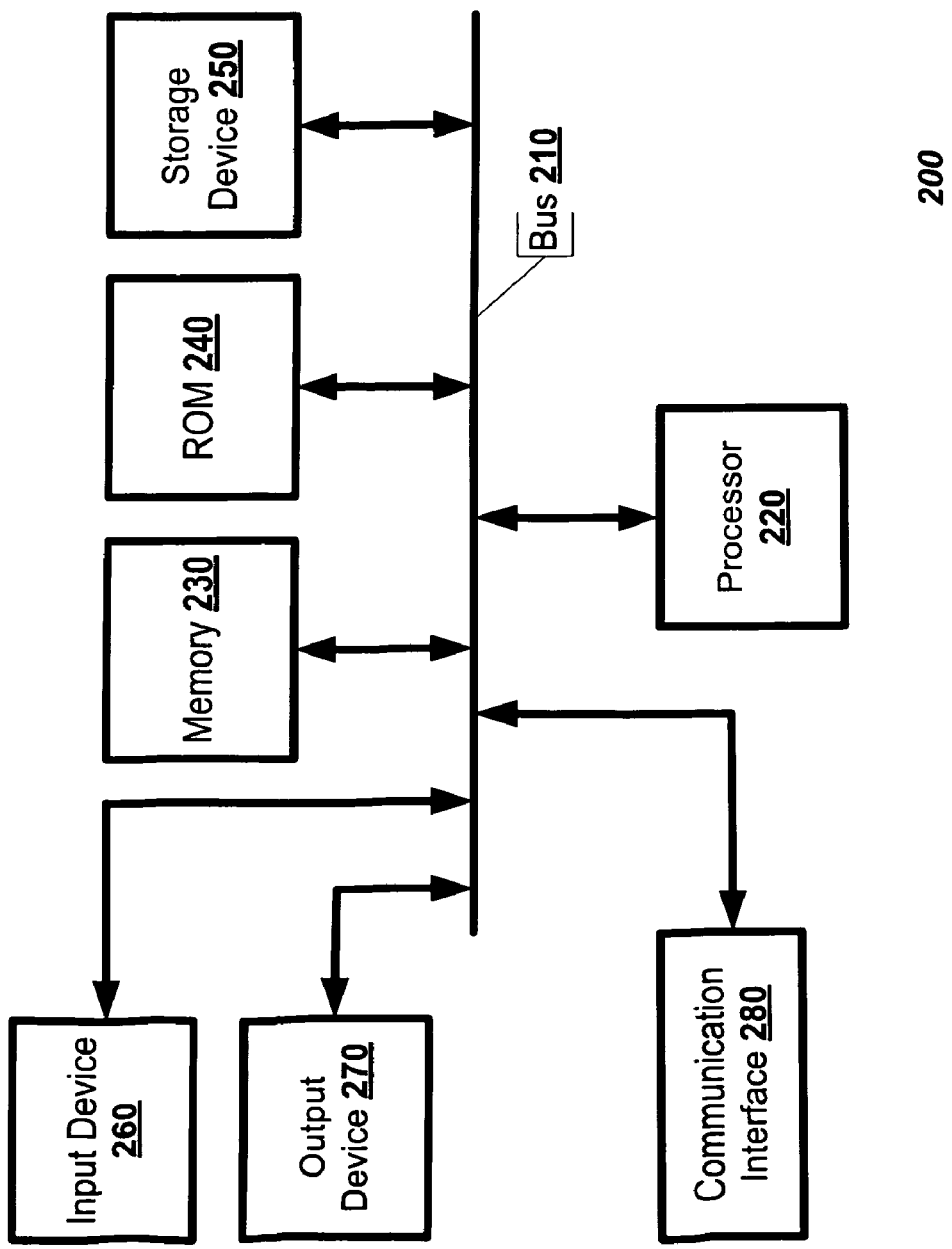
FIG. 2 illustrates, in a block diagram, an exemplary computing device that may be used as a computing platform for e-mail transmission or data sharing.

FIG. 2 illustrates, in a block diagram, an exemplary computing device 200 that may act as a server in STS 102, source client device 108, source e-mail server 106, target client device 114, or target e-mail server 112. Computing device 200 may be a personal computer, laptop, or other computing device capable of sending e-mail or other data transmissions over a network, such as the internet or other data networks. Computing device 200 may include a bus 210, a processing device 220, a memory 230, a read only memory (ROM) 240, a storage device 250, an input device 260, an output device 270, and a communication interface 280. Bus 210 may permit communication among the components of computing device 200.

Processing device 220 may include at least one conventional processor or microprocessor that interprets and executes instructions. Memory 230 may be a random access memory (RAM) or another type of dynamic storage device that stores information and instructions for execution by processing device 220. Memory 230 may also store temporary variables or other intermediate information used during execution of instructions by processing device 220. ROM 240 may include a conventional ROM device or another type of static storage device that stores static information and instructions for processing device 220. Storage device 250 may include any type of media, such as, for example, magnetic or optical recording media and its corresponding drive.

Input device 260 may include one or more conventional mechanisms that permit a user to input information to computing device 200, such as a keyboard, etc. Output device 270 may include one or more conventional mechanisms that output information to the user, including a display, a printer, or other output devices. Communication interface 280 may include any transceiver-like mechanism or network connection that enables processing device 220 to communicate with other devices or networks. Communication interface 280 may be a wireless, wired or optical interface.

Computing device 200 may perform such functions in response to processing device 220 executing sequences or sets of instructions contained in a computer-readable medium, such as, for example, memory 230, a magnetic disk, an optical disk, or other medium. Such instructions may be read into memory 230 from another computer-readable medium, such as storage device 250, or from a separate device via communication interface 280.

One or more source client devices 108, acting as a host entity computing platform, may be used to establish a trusted connection with one or more target client devices 114, acting as a guest entity computing platform, in target intranet 110. The host entity may use an e-mail program to send an electronic invitation for a user external to the source intranet 104 to enter into a trusted connection with the host entity. The electronic invitation may contain data regarding the relationship, such as the person's identity and how to access any available services. As the electronic invitation is being sent beyond borders of the source intranet 104, the user may secure the invitation data using the trust federation so that the person receiving the data may be guaranteed that the invitation has not been spoofed or otherwise compromised.

Figure 3:
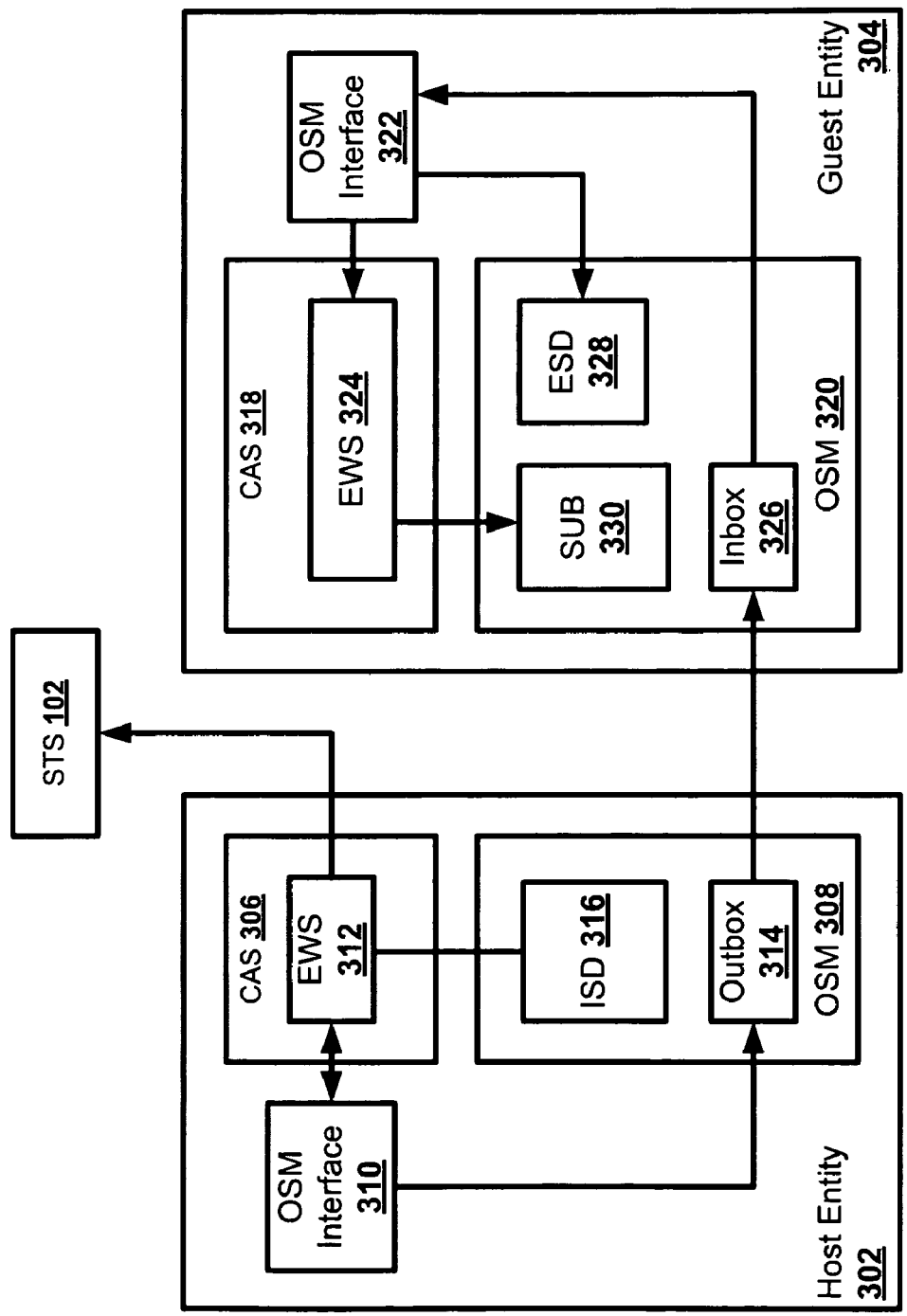
FIG. 3 illustrates, in a block diagram, one embodiment of a trusted connection between a host entity and an external guest entity.

FIG. 3 illustrates, in a block diagram, one embodiment of a trusted connection 300 between a host entity and an external guest entity. A host entity 302 may be a single user, a network system of multiple users, an organization, or any type of entity capable of interacting with a computerized network. A guest entity 304 may be a single user, a network system of multiple users, an organization, or any type of entity capable of interacting with a computerized network. Host entity 302 and guest entity 304 may both belong to a trust federation administered by a STS 102, which may provide trusted tokens to a member user to allow member users to securely interact with each other.

Host entity 302 may have a client access server module (CAS) 306 and an office services management module (OSM) 308. A user may use OSM interface 310 to interact with CAS module 306 and OSM module 308. CAS module 306 may support web interactions by host entity 302, using an embedded web services module (EWS) 312. EWS module 312 may facilitate interactions between host entity 302 and STS 102. CAS module 306 may be present in a source client device 108 acting as a host entity 302 or may be separately in a source e-mail server 106. OSM module 308 may have an outbox module 314 for delivering e-mail to a network, such as the internet, and one or more internal service and data (ISD) folders 316. ISD folders 316 may be folders for various services provided by OSM module 308, such as e-mail storage, calendars, address book, task lists, and other administrative office functionalities.

OSM interface 310 may detect guest entity 304, who the user desires to have access to ISD functions. EWS module 312 may request a trusted token from STS 102 for guest entity 304. EWS module 312 may add a SMTP address for guest entity 304, or other guest entity identifier, and a relationship identifier (ID), identifying the relationship between guest entity 304 and host entity 302, to an access control list (ACL) for ISD folder 316. EWS module 312 may encrypt the relationship ID and other subscription information using a proof of possession (POP) associated with the trusted token. OSM interface 310 may add a sharing payload to an invitation message and submit the invitation message to the outbox module 314 for delivery. Outbox module 314 may deliver the invitation message through normal channels.

Guest entity 304 may have a CAS module 318 and an OSM module 320. A user may use an OSM interface 322 to interact with CAS module 318 and OSM module 320. CAS module 318 may be present in a target client device 114 acting as a guest entity 304 or may be separately in a target e-mail server 112. CAS module 318 may support web interactions by guest entity 304, using EWS module 324. EWS module 324 may facilitate interactions between guest entity 304 and STS 102, as well as other web presences. OSM module 320 may have an inbox module 326 for delivering e-mail from the network. OSM module 320 may contain external service and data (ESD) folders 328 for storing data from ISD folders 316 in host entity 302 and a subscription (SUB) folder 330 for storing subscription data for accessing host entity 302.

OSM interface 322 may detect an invitation message from an external sender in the inbox module 326. OSM interface 322 may create ESD folder 328 in the OSM module to store ISD folder 316 data. OSM interface 322 may call EWS module 324 to process the sharing payload of the invitation message. EWS module 324 may decrypt the trusted token in the sharing payload and create SUB folder 330 in OSM module 320.

Figure 4:
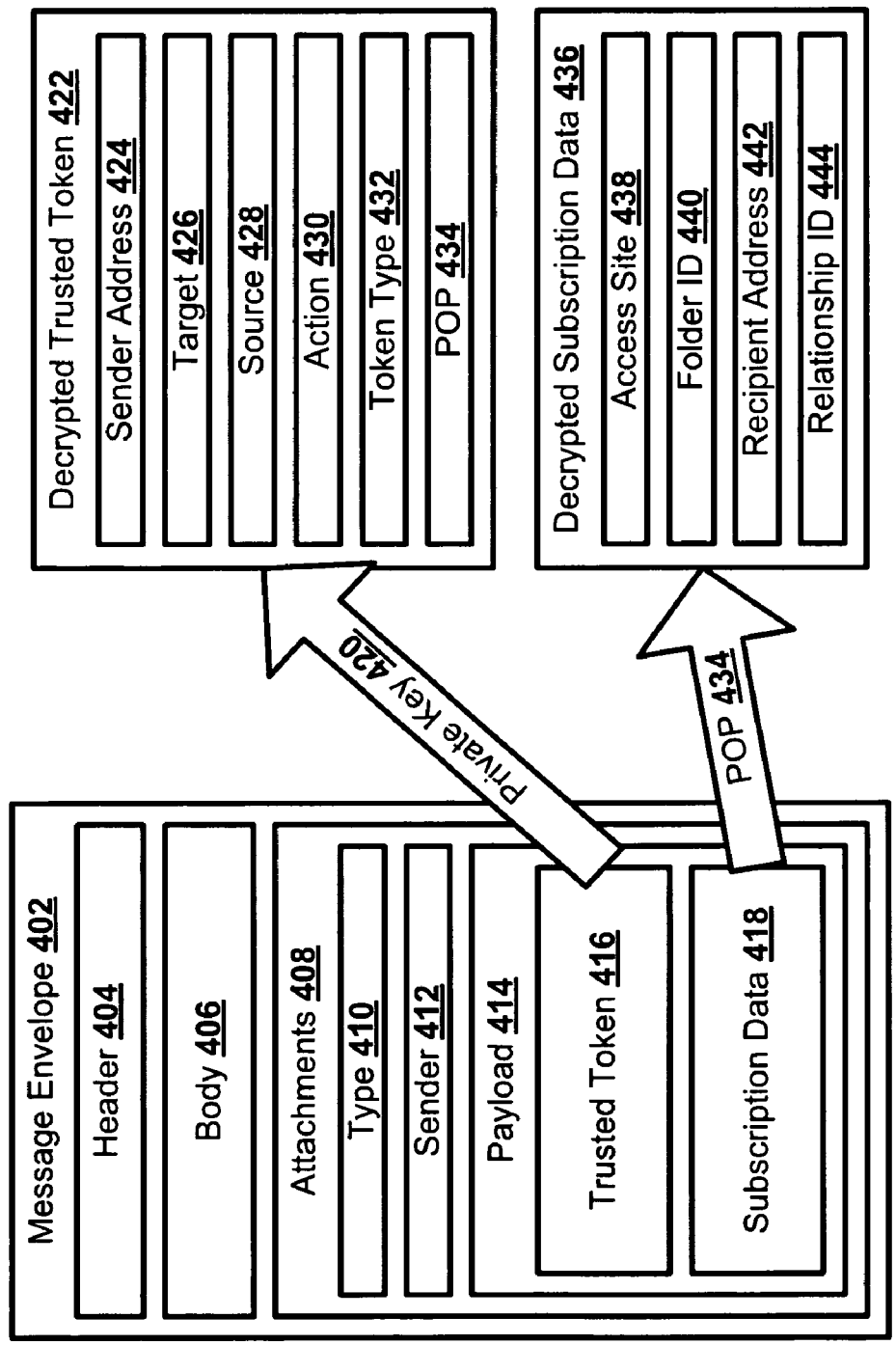
FIG. 4 illustrates, in a block diagram, one embodiment of an invitation message.

FIG. 4 illustrates, in a block diagram, one embodiment of a trusted connection invitation message 400. Invitation message 400 may have a message envelope 402 with a header 404 containing routing and addressing data, a body 406 containing any personalized message text between the user of the host entity 302 and the guest entity 304, and invitation message attachments 408. Invitation message attachments 408 may have a sharing type label 410 indicating the sharing payload is an invitation message, a sender ID 412, and a sharing payload 414. Sharing payload 414 may include a trusted token 416 and a set of encrypted subscription data 418.

EWS module 324 may use a private key 420 provided by STS 102 to decrypt trusted token 416. A decrypted trusted token 422 may have a sender address 424, a target network 426, a source network 428, an action 430 being performed with the message, a token type 432, and a POP 434.

EWS module 324 may use POP 434 to decrypt encrypted subscription data 418. Decrypted subscription data 436 may have an access site address 438 that guest entity 304 may use to access ISD folder 316 on host entity 302, a folder ID 440 to identify the folder to access on host entity 302, a recipient address 442, and a relationship ID 444 that represents the relationship between guest entity 304 and host entity 302.

Figure 5:
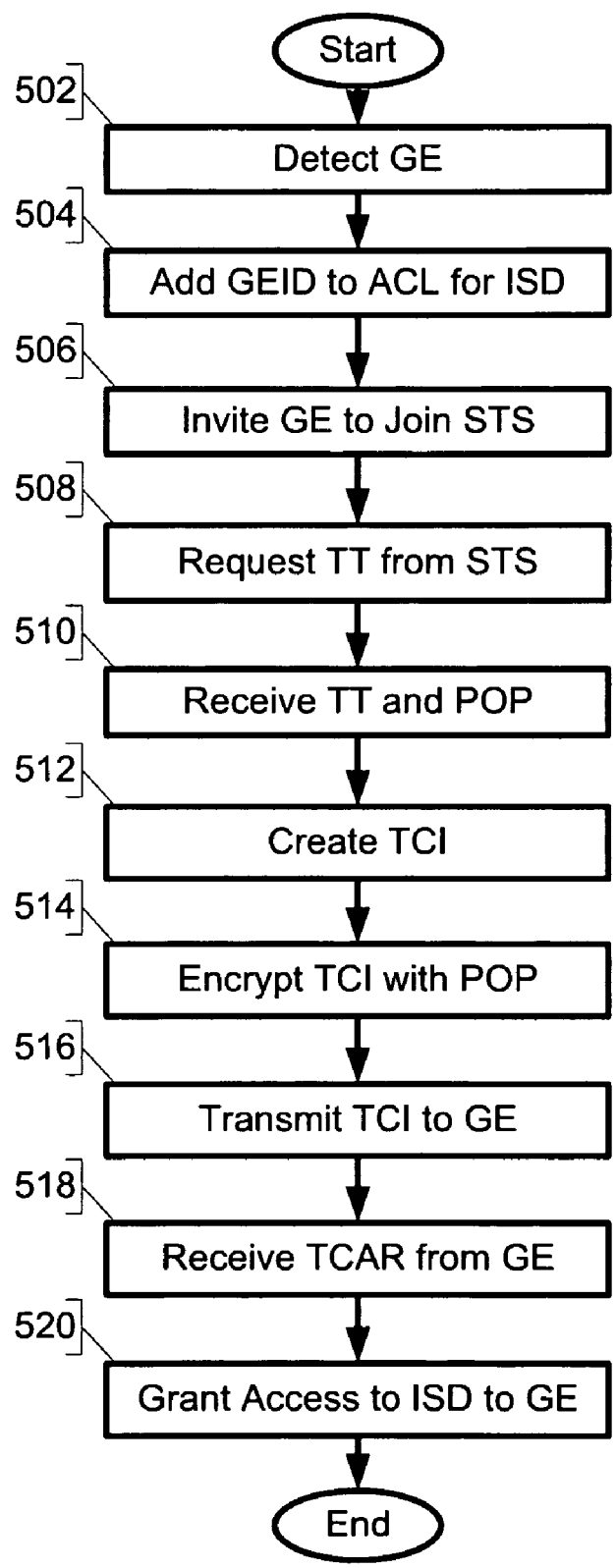
FIG. 5 illustrates, in a flowchart, one embodiment of a method for a host entity to establish a trusted connection.

FIG. 5 illustrates, in a flowchart, one embodiment of a method 500 for host entity 302 to establish a trusted connection. Host entity 302 may detect a guest entity (GE) 304 with whom host entity 302 wishes to establish a trusted connection (Block 502). EWS module 312 may add a guest entity ID to the ACL of the ISD folder 316 (Block 504). If GE 304 does not belong to a STS 102, to which host entity 302 belongs, host entity 302 may invite GE 304 to join STS 102 (Block 506). GE 204 may contact a system administrator of the guest organization for the administrative privileges for the network in order to validate the criteria to join STS 102. If GE 304 is unable to join a STS 102, host entity 302 may not be able to establish a trusted connection. EWS module 312 may request a trusted token (TT) 416 for GE 304 from STS 102 (Block 508). EWS module 312 may receive TT 416 and POP 434 from STS 102 (Block 510). EWS module 312 may create a trusted connection invitation (TCI) message 400 to invite GE 304 to create a trusted connection with host entity 302 (Block 512). EWS module 312 may encrypt TCI message 400 with POP 434 for GE 304 (Block 514). Outbox module 314 may transmit the encrypted TCI message 400 to GE 304 (Block 516). Host entity 302 may receive a trusted connection access request (TCAR) from GE 304 using decrypted subscription data 436 sent in TCI message 400 (Block 518). Host entity 302 may grant access to ISD folder 316 to GE 304 (Block 520).

Figure 6:
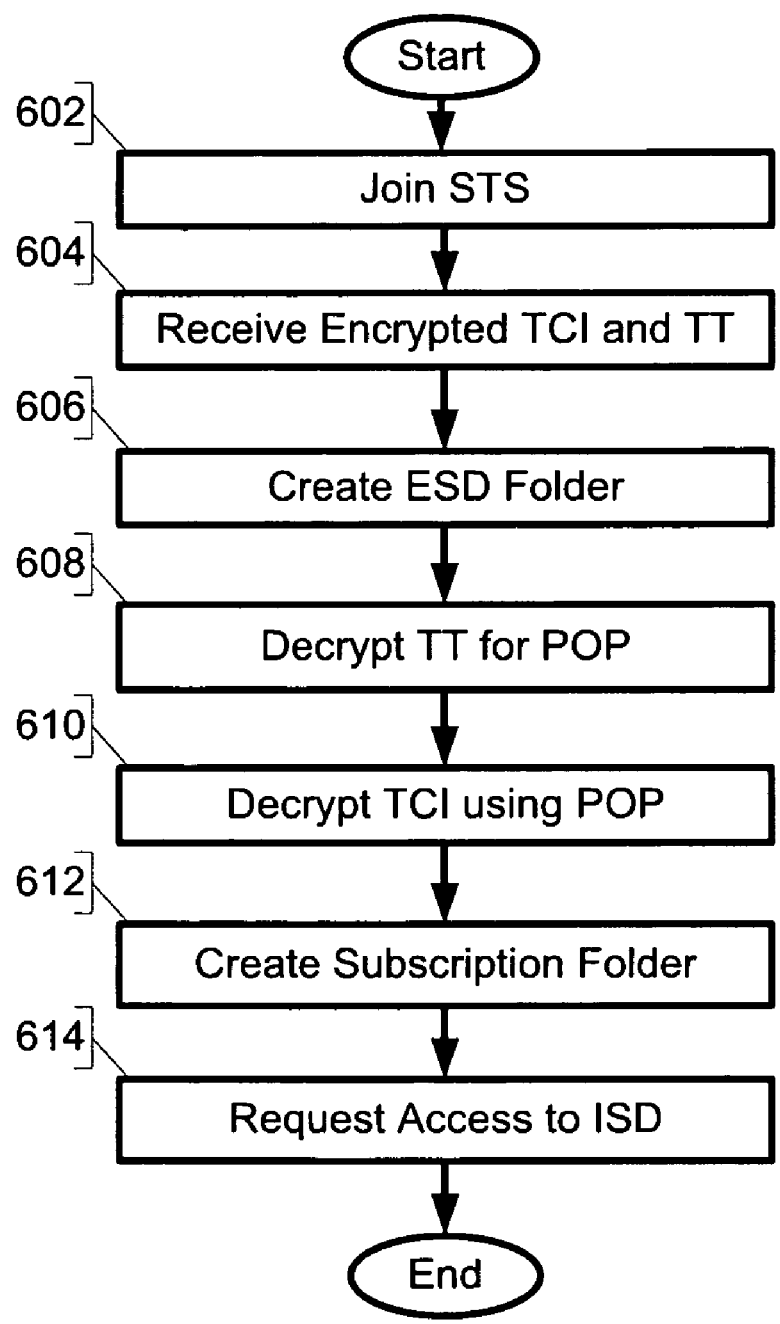
FIG. 6 illustrates, in a flowchart, one embodiment of a method for a host entity to establish a trusted connection.

FIG. 6 illustrates, in a flowchart, one embodiment of a method 600 for host entity to establish a trusted connection. If GE 304 does not belong to STS 102, to which host entity 302 belongs, GE 304 may join STS 102 (Block 602). GE 304 may contact a system administrator of the guest organization for the administrative privileges for the network in order to validate the criteria to join STS 102. Inbox module 326 may receive an encrypted TCI message 400 from host entity 302, including a private key 420 encoded TT 416 (Block 604). OSM module 320 may create an ESD folder 328 to contain data from ISD folder 316 of host entity 302 (Block 606). EWS module 324 may decrypt TT 416 using private key 420 to access POP 434 for GE 304 (Block 608). EWS module 324 may decrypt TCI message 400 using POP 434 (Block 610). EWS module 324 may create subscription folder 330 to contain decrypted subscription data 436 (Block 612). GE 304 may request access to ISD folder 316 on host entity 302 (Block 614).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for creating a trusted connection, comprising:
creating, by a host entity of an organization, a trusted connection invitation for an external guest entity outside of the organization, the trusted connection invitation including a proof of possession of a trusted token;
encrypting, by the host entity, the trusted connection invitation, at least a portion of the trusted connection invitation being encrypted using the proof of possession of the trusted token;

transmitting, by the host entity, the encrypted trusted connection invitation to the external guest entity;

receiving, by the host entity, a trusted connection access request from the external guest entity, the trusted connection access request including decrypted data from the encrypted at least a portion of the trusted connection invitation; and granting, by the host entity to the external guest entity, access to folders stored at the host entity based on content of the received trusted connection access request, the folders being related to at least one service provided by the host entity.

2. The method of claim 1, further comprising:

receiving, by the host entity, the trusted token from a secure token service.

3. The method of claim 2, wherein:

the trusted token includes the proof of possession.

4. The method of claim 2, further comprising:

inviting, by the host entity, the external guest entity to join the secure token service.

5. The method of claim 1, wherein the trusted connection invitation contains subscription data for an internal service of a host entity.

6. The method of claim 5, wherein:

the granting access to folders stored at the host entity further comprises granting access to the internal service by the external guest entity.

7. The method of claim 1, further comprising:

adding, by the host entity, an external guest entity identifier to an access control list for an internal service of the host entity.

8. A host entity computing platform, comprising:

at least one computing device of an organization, each of the at least one computing device further comprising:

at least one processor; and a memory communicatively connected to the at least one processor, wherein the at least one computing device is arranged to implement:

an embedded web services module to request and receive a trusted token and a proof of possession of the trusted token, and to encrypt a trusted connection invitation for an external guest entity outside of the organization, the trusted connection invitation including the trusted token and the proof of possession of the trusted token, at least a portion of the trusted connection invitation being encrypted using the proof of possession of the trusted token; and an office services management module to transmit the encrypted trusted connection invitation to the external guest entity, wherein the host entity computing platform is arranged to receive a trusted connection access request from the external guest entity, the trusted connection access request including decrypted data from the encrypted at least a portion of the trusted connection invitation; and the host entity computing platform granting, to the external guest entity, access to folders stored at the host entity computing platform based on content of the received trusted connection access request, the folders being related to at least one service provided by the host entity.

9. The host entity computing platform of claim 8, wherein the embedded web service module receives the trusted token from a secure token service.

10. The host entity computing platform of claim 9, wherein the trusted token includes the proof of possession for the trusted token.

11. The host entity computing platform of claim 9, wherein the office services management module invites the external guest entity to join the secure token service.

12. The host entity computing platform of claim 8, wherein the trusted connection invitation contains subscription data for an internal service.

13. The host entity computing platform of claim 12, wherein the office services management module receives the trusted connection access request from the external guest entity and grants access to the internal service in response to the receiving of the trusted connection access request.

14. The host entity computing platform of claim 8, wherein the office services management module adds an external guest entity identifier to an access control list for an internal service.

15. A computer-readable storage device having a set of instructions stored thereon for a method to be executed by at least one processor, the method comprising:

receiving, in a guest entity outside an organization, an encrypted trusted connection invitation and a trusted token from a host entity of the organization;

decrypting, by the guest entity, the trusted token using a private key, the trusted token including a proof of possession of the trusted token;

decrypting, by the guest entity, a portion of the trusted connection invitation using the proof of possession of the trusted token;

sending, by the guest entity, a trusted connection access request including data from the decrypted portion of the trusted connection invitation; and accessing, by the guest entity, folders stored at the host entity as a result of the sending of the trusted connection access request, the folders being related to at least one service provided by the host entity.

16. The computer-readable storage device of claim 15, wherein:

the private key is provided by a secure token service.

17. The computer-readable storage device of claim 16, wherein the method further comprises:

joining, by the guest entity, the secure token service.

18. The computer-readable storage device of claim 15, wherein the trusted connection invitation contains subscription data for an internal service of the host entity.

19. The computer-readable storage device of claim 18, wherein the method further comprises:

requesting access to the internal service, by the guest entity, using the subscription data.

20. The computer-readable storage device of claim 19, wherein the method further comprises:

creating, by the guest entity, a subscription folder for the internal service using the subscription data.

* * * * *